No. 713,471. Patented Nov. 11, 1902.
F. MATTHEWS.
REIN HOLDER.
(Application filed July 21, 1902.)
(No Model.)
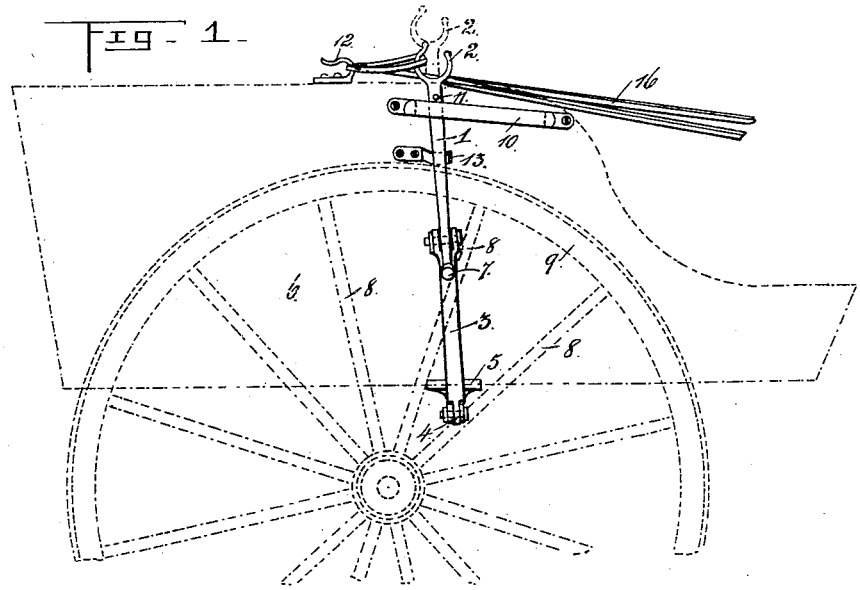
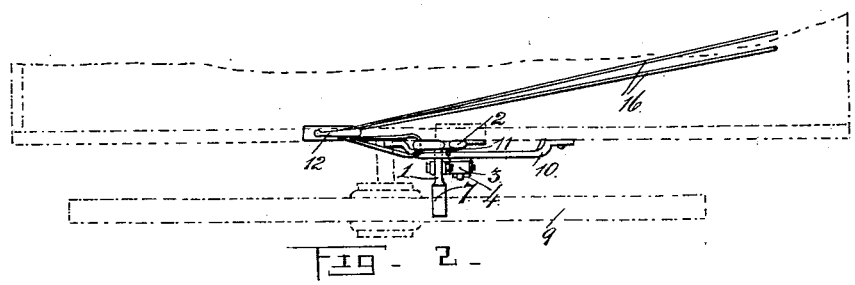
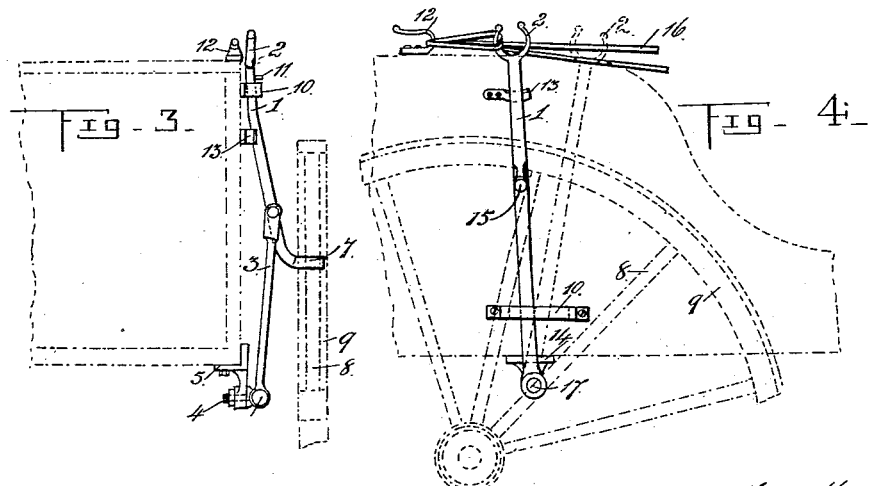
Witnesses
Inventor: Fred Matthews
by his Attorney

UNITED STATES PATENT OFFICE.

FRED MATTHEWS, OF WELLINGTON, NEW ZEALAND.

REIN-HOLDER.

SPECIFICATION forming part of Letters Patent No. 713,471, dated November 11, 1902.

Application filed July 21, 1902. Serial No. 116,421. (No model.)

*To all whom it may concern:*

Be it known that I, FRED MATTHEWS, a subject of His Majesty the King of Great Britain and Ireland, residing at 8 Rintoul street, Wellington, in the Colony of New Zealand, have invented a new and useful Improved Rein-Holder, of which the following is a specification.

In this invention a hand-lever pivoted at the side of a vehicle has a projecting arm which when the lever is operated passes between the spokes of a wheel of the vehicle, and thereby limits its movement. The hand-lever is guided in and its stroke is limited by a bracket fixed upon the side of the vehicle. A hooked bracket is employed around which the reins are passed before they are looped in a fork formed upon the upper end of the hand-lever. A spring-catch retains the hand-lever when out of operation.

I will now more particularly describe my invention by the aid of the accompanying drawings, wherein—

Figure 1 is a side elevation, the vehicle to which my apparatus is applied being shown in dotted lines; Fig. 2, a corresponding part plan, and Fig. 3 a part end elevation. Fig. 4 is a side elevation illustrating a modification.

Referring first to Figs. 1 to 3, inclusive, which show the invention in operation, the hand-lever 1, which is curved outwardly at each end, is forked at its upper end 2 and is fulcrumed upon the end of a link 3, which is hinged upon a pin 4, pivotally mounted in a bracket 5, secured to the side 6 of the vehicle. Lever 1 extends beyond its fulcrum and has an arm 7 at its end, which is covered with leather and is arranged when the lever is operated to project between the spokes 8 of the wheel 9. A guide-bracket 10, secured upon the vehicle, guides the hand-lever 1 and limits its vibration longitudinally with the vehicle. A pin 11, projecting from the hand-lever, prevents it from passing too far downwardly through the bracket 10. A hook-bracket 12 is secured upon the vehicle behind the hand-lever.

In operation the driving-reins 16 are passed around the hook-bracket 12 and their ends looped in the fork at the upper end of the hand-lever. The hand-lever is pushed down, whereby the upper end of link 3 moves outwardly, and the arm 7 at the lower end of the hand-lever passes between two spokes of the wheel, as shown in the drawings. If the horse should start, movement of the wheel causes the arm upon the lever to be engaged by a spoke and the reins are drawn tight, the pull upon the reins increasing as the wheel turns until the lever reaches the end of its travel in guide-bracket 10, when forward movement of the wheel is arrested and the pull upon the reins continues, but is not increased. If the horse should back, the reins are not pulled; but the wheel is soon stopped by the hand-lever reaching the end of its backward stroke in the guide-bracket 10.

The hand-lever when out of its operative position is passed into a spring hook-catch 13, bolted to the side of the vehicle.

In the modification shown in Fig. 4 the hand-lever is journaled at its lower end upon a short spindle 17, fixed in a bracket 14, and has an arm 15 projecting laterally to pass between two spokes of the wheel, as described in reference to the arm 7 at the end of the hand-lever in the previous figures. In this arrangement the hand-lever has, by giving the metal an outward spring in forging and constructing the parts, a normal tendency to move laterally outward from the vehicle at its upper end, so that it is only necessary to remove the hand-lever from the catch 13 to cause the arm 15 to project between the spokes.

What I claim as my invention, and desire to secure by Letters Patent, is—

1. In apparatus for the purpose indicated the combination with the driving-reins of a hand-lever having its upper end forked, an arm upon said hand-lever adapted to pass between the spokes of a wheel of the vehicle, a guide-bracket limiting the vibration of the hand-lever and a hooked bracket fixed upon the vehicle at the rear of the hand-lever and around which the reins are passed before being looped in the forked end of the lever.

2. Apparatus for the purpose indicated consisting of the combination with the driving-reins of a hand-lever forked at its upper end to receive the reins, and fulcrumed upon a link the opposite end of which is hinged upon a hinge-pin pivoted in a bracket, an arm at the lower end of the hand-lever adapted to pass between the spokes of a wheel of the vehicle when said lever is operated a guide-bracket limiting the vibration of the hand-lever and a hooked bracket, around which the reins are passed, fixed upon the vehicle behind the hand-lever as specified.

In witness whereof I have hereunto set my hand in presence of two witnesses.

FRED MATTHEWS.

Witnesses:
   HENRIE H. RAYWARD,
   ERNEST J. ANSTISS.